United States Patent [19]

Igarashi

[11] Patent Number: 5,130,114

[45] Date of Patent: Jul. 14, 1992

[54] CATALYST FOR STEAM REFORMING OF HYDROCARBON

[76] Inventor: Akira Igarashi, 24-2, 1-chome, Nishi-Shinjuku, Shinjuku-ku, Tokyo, Japan

[21] Appl. No.: 636,006

[22] Filed: Jan. 3, 1991

Related U.S. Application Data

[60] Continuation of Ser. No. 498,492, Mar. 26, 1990, abandoned, which is a division of Ser. No. 321,684, Mar. 10, 1989, abandoned.

[30] Foreign Application Priority Data

| Aug. 4, 1983 [JP] | Japan | 63-194752 |
| Mar. 12, 1988 [JP] | Japan | 63-59165 |
| Aug. 4, 1988 [JP] | Japan | 63-194751 |

[51] Int. Cl.$^5$ ............................................. C01B 3/26
[52] U.S. Cl. ..................................... 423/652; 423/653; 423/654
[58] Field of Search ......................... 423/652, 653, 654

[56] References Cited

U.S. PATENT DOCUMENTS

| 2,067,729 | 1/1937 | Porter | 423/652 |
| 2,135,058 | 11/1938 | Spicer et al. | 423/652 |
| 3,222,132 | 12/1965 | Dowden | 423/652 |
| 3,389,965 | 6/1968 | De Ruiter et al. | 423/652 |
| 3,885,020 | 5/1975 | Whelan | 502/303 |
| 3,922,235 | 11/1975 | DeLuca et al. | |
| 3,965,252 | 6/1976 | Kmecak et al. | 423/651 |
| 4,233,189 | 11/1980 | Canditi et al. | 502/325 |
| 4,276,203 | 6/1981 | Pfefferle | 502/325 |
| 4,284,531 | 8/1981 | Simpson et al. | 502/313 |
| 4,539,310 | 9/1985 | Leftin et al. | 502/304 |
| 4,585,752 | 4/1986 | Ernest | 502/304 |
| 4,587,231 | 5/1986 | Sawamura et al. | 502/304 |
| 4,656,155 | 4/1987 | Josefowicz | 502/304 |
| 4,791,091 | 12/1988 | Bricker et al. | 502/303 |

FOREIGN PATENT DOCUMENTS

| 651695 | 1/1962 | Canada | 423/652 |
| 2531030 | 2/1976 | Fed. Rep. of Germany . | |
| 53-12917 | 5/1978 | Japan . | |
| 56-91844 | 7/1981 | Japan . | |
| 57-4232 | 1/1982 | Japan . | |
| 2114650 | 5/1987 | Japan | 502/325 |
| 877359 | 9/1961 | United Kingdom | 423/652 |
| 1029235 | 5/1966 | United Kingdom . | |
| 4077913 | 3/1978 | United Kingdom . | |

*Primary Examiner*—Wayne Langel
*Attorney, Agent, or Firm*—Nikaido, Marmelstein, Murray & Oram

[57] ABSTRACT

The present invention provides a catalyst for steam reforming of hydrocarbons which comprises ruthenium supported on a zirconia carrier; and a catalyst for steam reforming of hydrocarbons which comprises (A) at least one element selected from the group consisting of rhodium and rutheniuim as an element imparting mainly reforming activity and (B) at least one element selected from the group consisting of nickel, lanthanum, praseodymium, neodymium, samarium, thorium, uranium, chromium, magnesium, calcium, and yttrium as an element for imparting co-catalyst function which are supported on a zirconia carrier; and furthermore a catalyst for steam reforming of hydrocarbons which comprises at least one element selected from the group consisting of rhodium and ruthenium which is supported on a partially stabilized zirconia carrier.

2 Claims, No Drawings

_CATALYST FOR STEAM REFORMING OF HYDROCARBON_

This application is a continuation of application Ser. No. 498,492, filed Mar. 26, 1990, now abandoned, which is a division of application Ser. No. 321,684, filed Mar. 10, 1989, now abandoned.

BACKGROUND OF THE INVENTION

1. Field of the Invention

The present invention relates to a catalyst for steam reforming of hydrocarbon and more particularly to a catalyst for steam reforming of hydrocarbon which has superior properties such as high catalyst activity, high heat resistance and mechanical strength and long life and which can be suitably utilized, for example, in a hydrogen producing plant for fuel cells and a small size hydrogen producing plant.

2. Description of the Related Art

Hitherto, as catalysts for acceleration of steam reforming reaction comprising reacting a hydrocarbon with steam to form hydrogen, carbon monoxide, methane and carbon dioxide, there have been catalyst systems as disclosed in (1) Japanese Patent Kokoku No. 12917/78, (2) Japanese Patent Kokai No. 91844/81 and (3) Japanese Patent Kokai No. 4232/82.

The catalyst system disclosed in Japanese Patent Kokoku No. 12917/78 comprises an alumina carrier which supports metallic nickel as a catalyst active component and, as co-catalysts, metallic silver in an amount of at least 2 mg atom per 100 g of catalyst and at least one of oxides of yttrium, lanthanum, cerium, praseodymium, neodymium and samarium in an amount of at least 2 mg atom per 100 g of catalyst and at a ratio in number of atom to silver of 10 or less.

The catalyst system disclosed in the above Japanese Patent Kokai No. 91844/81 comprises rhodium and zirconium oxide.

The catalyst system disclosed in the above Japanese Patent Kokai No. 4232/82 comprises an active alumina containing 0.5-10% by weight of silica and 1% by weight or less, in terms of oxide, of an alkali metal or an alkaline earth metal and 0.05-20% by weight of ruthenium supported on the active alumina.

However, the alumina-supported catalyst systems disclosed in the first and the third patent publications suffer from the problems that they have activity at temperatures of higher than about 500° C. and if the temperature is raised in order to further increase activity carbon is deposited on the catalyst and that when firing temperature is raised, surface area is conspicuously reduced resulting in reduction of catalyst activity or mechanical strength decreases due to shrinking or pressure loss of catalyst layer increases due to powdering to make the operation difficult.

With reference to the catalyst system disclosed in the second patent publication, the reaction temperature may be lower than for the above alumina supported catalyst systems, for example, 500° C., but catalyst activity is not sufficient and besides steam/carbon ratio is high, namely, 24 mol/mol and thus such catalyst system is not necessarily advantageous for industrial process for reforming hydrocarbons with steam.

The inventors have already found that a catalyst system comprising rhodium metal supported on a zirconium carrier is a catalyst effective for reforming hydrocarbons with steam, which has high activity and can be controlled in the amount of formation of carbon on the catalyst. [cf. Igarashi et al: The 58th Catalyst Forum (A), 4 Ren B12, Nagoya].

This catalyst system is still not enough to be an industrial catalyst owing to its short life and insufficient activity.

SUMMARY OF THE INVENTION

An object of the present invention is to provide a long life catalyst for steam reforming which is free from the above-mentioned problems and which has high activity even at a reaction temperature lower than 500° C. and can perform steam reforming with low steam/-carbon ratio.

Another object of the present invention is to provide a catalyst for steam reforming of hydrocarbons which is free from the above-mentioned problems and which is high in catalyst activity, excellent in heat resistance and mechanical strength and improved in stability, reformability and catalyst life.

The present invention for attaining the above objects resides in:

a catalyst for steam reforming of hydrocarbons (catalyst I) which is characterized by comprising a zirconia carrier on which ruthenium is supported;

a catalyst for steam reforming of hydrocarbons (catalyst II) which is characterized by comprising a zirconia carrier on which are supported (A) at least one metal selected from the group consisting of rhodium and ruthenium as an element to impart mainly reforming activity and (B) at least one element selected from the group consisting of nickel, lanthanum, praseodymium, neodymium, samarium, thorium, uranium, chromium, magnesium, calcium and yttrium as an element to impart co-catalyst function; and a catalyst for steam reforming of hydrocarbons (catalyst III) which is characterized by comprising a partially stabilized zirconia carrier on which is supported at least one element selected from the group consisting of rhodium and ruthenium.

DESCRIPTION OF THE PREFERRED EMBODIMENTS

(1) Catalyst I

Zirconia carrier

It is especially important that zirconia is selected as a carrier in the present invention. This is because this zirconia carrier is especially high in reactivity with water, performs improvement of ability to reform hydrocarbons with steam and restrains deposition of carbon on the catalyst.

Such zirconia carrier includes zirconium oxide and a substance capable of being converted to zirconium oxide at the time of preparation of catalyst or at steam reforming.

The above zirconium oxide may be commercially available one.

As the substance capable of being converted to zirconium oxide at the time of preparation of catalyst or at steam reforming, mention may be made of, for example, zirconium hydroxide, zirconium halide, zirconium nitrate, zirconyl nitrate, zirconium acetate, zirconium oxalate, zirconium alkoxide, zirconium oxychloride and organozirconium compound.

Sparingly soluble salts may be solubilized and used by adding, for example, an acid.

The above various zirconium compounds may be used alone or in combination of two or more.

Among them, zirconyl nitrate is especially preferred.

When zirconyl nitrate is used, zirconium oxide can be prepared by subjecting zirconyl nitrate to precipitation with ammonia water and thermally decomposing the precipitate. This may also be prepared by hydrolysis of an alkoxide compound of zirconium.

The zirconium oxide used as a carrier may be anhydrous or may contain water of crystallization.

Most preferred is zirconium oxide.

In the present invention, other carriers may also be used together with the aforementioned zirconium compounds as zirconia carriers as far as attainment of the object of the present invention is not obstructed.

Other carriers include silica, alumina and zeolite.

The above-mentioned zirconium compounds and other carriers can be used as mixtures, or compositions such as composite oxides or composites comprising said zirconium compounds supported or coated on other carriers. Shape of the zirconia carrier is not critical and may have optional shapes such as fine powders, beads, pellets, plates, films and monolith.

Metal to be supported; ruthenium

As ruthenium sources for supporting ruthenium, mention may be made of, for example, ruthenium halides such as ruthenium iodide and ruthenium chloride, haloruthenates such as ammonium chlororuthenate, haloruthenic acids such as chlororuthenic acid, ruthenium oxides such as ruthenium hydroxide, ruthenium dioxide and ruthenium tetraoxide, ruthenates such as potassium ruthenate and organic ruthenium compounds such as ruthenium carbonyl.

Such ruthenium sources may be used alone or in combination of two or more.

Amount of ruthenium supported is generally 0.1-5% by weight, preferably 0.3-3% by weight of zirconia carrier.

In this case, if amount of ruthenium is too much, the carrier is covered with the supported metal and effects corresponding to the supporting amount cannot be obtained.

Preparation of catalyst

Process for preparation of catalyst I has no special limitation and there may be optionally employed, for example, impregnation process, dipping process, wet adsorption process, dry adsorption process, CVD process, solvent evaporation process dry mixing process, wet mixing process, spray coating process and combination of them. Operation method for supporting also includes any of stationary method, stirring method, solution passing method, solvent refluxing method and the like. An example of suitable preparation of catalyst is explained below.

That is, zirconium hydroxide is fired, for example, at 500°-800° C. for 1 hour to several hours and the resulting fired product is dipped in a solution or colloidal dispersion of the above-mentioned ruthenium compound normally for 0.1-10 hours, preferably 0.5-5 hours, followed by mixing or kneading and evaporating to dryness. Then, the product is dried at 100°-200° C. over 0.1-24 hours and fired at 500°-800° C. for 0.1-20 hours in air or nitrogen stream. If necessary, the fired product is molded into desired shape and subjected to reducing treatment to obtain a catalyst for steam reforming of the present invention.

Solvents used for solution or colloidal dispersion of the ruthenium compound are not limitative as far as they can dissolve the ruthenium compound or can keep stably as a uniform colloid solution. Aqueous solvents, non-aqueous solvents and mixed solvents thereof can be used.

In carrying out the dipping, if necessary, various acids, bases, salts, oxidizing agents, reducing agents, pH modifiers, buffers and resolution accelerators can be added to the solution or colloidal dispersion of the ruthenium compound.

Preferably, the reducing treatment mentioned above is performed by contacting the catalyst precursor packed in a reaction tube with hydrogen under heating.

(2) Catalyst II

Catalyst II comprises a zirconia carrier on which are supported at least one element selected from the group consisting of rhodium and ruthenium as an active metal and at least one element selected from the group consisting of nickel, lanthanum, praseodymium, neodymium, samarium, thorium, uranium, chromium, magnesium, calcium and yttrium as a co-catalyst.

The catalyst II comprises combination of the specific active metal and the specific co-catalyst and can further improve ability of steam reforming of hydrocarbons together with employment of zirconia carrier. Besides, catalyst life can be further prolonged.

Zirconia carrier:

The same zirconia carrier as used in preparation of catalyst I can be used and so explanation thereof is omitted.

Elements used as those of group (A)

With reference to ruthenium, the same explanation as in catalyst I mentioned above can be made.

As rhodium source for supporting rhodium metal, mention may be made of, for example, rhodium halides such as rhodium chloride, halorhodates such as sodium chlororhodate and ammonium chlororhodate, halorhodic acids such as chlororhodic acid, rhodium (III) hydroxide, rhodium (IV) hydroxide, rhodium nitrate, rhodium oxide and organorhodium compounds such as rhodium carbonyl.

Such rhodium sources may be used alone or in combination of two or more.

Preferred are rhodium halides and especially preferred in rhodium trichloride.

In the catalyst II, elements of group (A) can be supported on a zirconia carrier. In this case, amount of the metal supported is normally 0.1-5% by weight, preferably 0.3-3% by weight of zirconia carrier and there is no limitation in ratio of two elements when two elements of group (A) are supported.

Elements used as those of group (B)

As nickel sources for supporting nickel, mention may be made of, for example, nickel chloride (hexahydrate), nickel chloride (anhydride), nickel bromide (hexahydrate), nickel bromide (anhydride), nickel iodide (hexahydrate), nickel iodide (anhydride), nickel nitrate, nickel sulfate, nickel acetate, nickel formate, nickel oxalate, nickel hydroxide, nickel oxide, nickel carbonate, nickel acetylacetonate and nickel carbonyl.

Lanthanum sources, praseodymium sources, neodymium sources, samarium sources, chromium sources, uranium sources, thorium sources, magnesium sources, calcium sources, or yttrium sources for supporting lanthanum, praseodymium, neodymium, samarium, chromium, uranium, thorium, magnesium, calcium or yttrium include nitrates, sulfates, carbonates, acetates, hydroxides, oxides, basic salts, alkoxides and organic compounds of these metals.

These sources may be used alone or in combination of two or more.

Amount of element of group (B) obtained from the above metal sources can vary depending on kind of metal and cannot be indiscriminately specified, but normally 0.1-10% by weight, preferably 0.3-5% by weight of metals supported. Preparation of catalyst:

Process for preparation of catalyst II is similar to that for catalyst I and has no special limitation. One suitable example of preparation of catalyst II is shown below.

That is, zirconium oxide is fired in the same manner as in preparation of catalyst I and the resulting fired product is dipped in a solution or a colloidal dispersion containing compounds of elements selected from group (A) and (B) and is treated in the same manner as in preparation of catalyst I to obtain a catalyst for steam reformation.

The fired product of zirconium oxide may be dipped in a solution or a colloidal dispersion of compounds of elements of group (A) and then in a solution or a colloidal dispersion of compounds of elements of group (B) or vice versa.

(3) Catalyst (III)

Partilly stabilized zirconia carrier

It is especially important that a partially stabilized zirconia carrier is selected as a carrier in the present invention.

This is because this partially stabilized zirconia carrier has inherited excellent properties as carrier such as especially high reactivity of zirconia per se with water, enhancement of ability to reform hydrocarbons with steam and prevention of deposition of carbon on catalyst and in addition to these properties, it is excellent in properties specific to partially stabilized zirconia resulting from addition of a stabilizer, namely, heat resistance and mechanical strength and is little in reduction of surface area even under a high temperature of at least 500° C. and can be stably used.

Such partially stabilized zirconia carrier can be obtained by modifying and stabilizing zirconia component with addition of a stabilizer.

Zirconium source used as raw material for zirconia component of this partially stabilized zirconia carrier includes zirconium oxide and substances capable of being converted into zirconium oxide (zirconia component) at the time of preparation of catalyst or at steam reforming.

The above zirconium oxide is the same as in catalyst I.

Zirconium alkoxide is especially preferred as zirconium source in catalyst III.

As stabilizers used as components of the partially stabilized zirconia carrier, mention may be made of, for example, yttrium oxide component, magnesium oxide component, cerium oxide component and other known various oxide components used as stabilizing components for so-called stabilized zirconia used in various fields of materials.

Among them, especially preferred are yttrium oxide component, magnesium oxide component and cerium oxide component.

These yttrium oxide component, magnesium oxide component and cerium oxide component can be formally expressed by $Y_2O_3$, $MgO$ and $CeO_2$, respectively.

Yttrium source used as raw material for preparation of the yttrium oxide component includes yttrium oxide and substances capable of being converted into yttrium oxide (yttrium oxide component) at the time of preparation of catalyst or at steam reforming. As the substances capable of being converted into yttrium oxide component, mention may be made of, for example, yttrium hydroxide, yttrium halides, yttrium oxyhalides, yttrium nitrate, yttrium carbonate, yttrium acetate, yttrium oxalate, and yttrium alkoxides such as yttrium trimethoxide, yttrium triethoxide, yttrium tripropoxide, yttrium triisopropoxide, and yttrium tributoxide.

Among them, yttrium alkoxides are especially preferred.

Magnesium source used as raw material for preparing the magnesium oxide component includes magnesium oxide and substances capable of being converted into magnesium oxide (magnesium oxide component) at the time of preparation of catalyst or at stem reforming.

As the substances capable of being converted into magnesium oxide component, mention may be made of, for example, magnesium hydroxide, magnesium halides, magnesium oxyhalides, magnesium nitrate, magnesium carbonate, magnesium acetate, magnesium oxalate, and magnesium alkoxides such as magnesium methoxide, magnesium ethoxide, magnesium propoxide, magnesium isopropoxide, and magnesium butoxide.

Among them, magnesium alkoxides are especially preferred.

Cerium source used as raw material used for preparation of the cerium oxide component includes cerium oxide and substances capable of being converted into cerium oxide (cerium oxide component) at the time of preparation of catalyst or at steam reforming. As the substances capable of being converted into cerium oxide component, mention may be made of, for example, cerium hydroxide, cerium halides, cerium oxyhalides, cerium nitrate, cerium carbonate, cerium acetate, cerium oxalate, and cerium alkoxides such as cerium methoxide, cerium ethoxide, cerium propoxide, cerium isopropoxide and cerium butoxide.

Among them, cerium alkoxides are especially preferred.

These yttrium compounds, magnesium compounds and cerium compounds may be used alone or in combination of two or more.

Sparingly soluble compounds can be used by solubilizing with addition of alcohol or acid.

The partially stabilized zirconia carrier can be used as a mixture or composition with other carriers.

Such other carriers include zirconia, silica, alumina and zeolite.

Shape of the partially stabilized zirconia carrier is not critical and may be any of, for example, fine powders, beads, pellets, plates, films and monoliths.

Preparation of partially stabilized zirconia carrier

Process for preparation of partially stabilized zirconia carrier used as a carrier of catalyst for steam reforming of hydrocarbons according to the present invention is not limitative and, for example, coprecipitation process, wet kneading process, dry kneading process and combination thereof can be optionally employed. A suitable example of preparation is shown below.

That is, the above-mentioned zirconium source, yttrium source, magnesium source and cerium source, for example, alkoxide compounds are used as raw material for preparation. These are precipitated as composite oxide or hydrate thereof comprising fine primary particles and having a large surface area by alkoxide hydrolysis process normally used for preparation of composite oxide in the field of preparation of catalysts. Then, the resulting precipitate is properly washed, thereafter dried and then, fired at a given temperature to obtain the partially stabilized zirconia carrier.

Firing temperature here is usually 400°-1,000° C., preferably 500°-850° C.

Firing atmosphere is preferably air.

If desired, the above firing step can be omitted. Metals to be supported; ruthenium and rhodium:

The same explanation as in catalyst II can be made on ruthenium and rhodium.

Preparation of catalyst

Process for preparation of catalyst III is the same as for catalyst I and catalyst II.

A suitable example of preparation of catalyst is shown below.

That is, the partially stabilized zirconia carrier obtained above is dipped in a solution or a colloidal dispersion of the above-mentioned ruthenium compound and/or rhodium compound normally for about 0.1-10 hours, preferably 0.5-5 hours, followed by mixing or kneading and evaporating to dryness. Then, the product is dried at 100°-200° C. for 0.1-24 hours and then fired at 500°-850° C. for 0.1-20 hours in air or nitrogen stream and, if necessary, molded into a desired shape, for example, by a tablet compressing method, followed by reduction treatment to obtain the catalyst for steam reforming of the present invention.

Steam reforming of hydrocarbon

The above-mentioned catalyst I, catalyst II and catalyst III which are catalysts for steam reforming are used for accelerating steam reforming of hydrocarbons.

The hydrocarbons to be reformed are not limitative and include, for example, straight chain or branched chain saturated aliphatic hydrocarbons such as methane, ethane, propane, butane, pentane, hexane, heptane, octane, nonane, and decane and cycloaliphatic saturated hydrocarbons such as cyclohexane, methylcyclohexane and cyclooctane.

These hydrocarbons are used alone or in combination of two or more or may be various purified petroleum fractions.

Steam to be reacted with hydrocarbons is not limitative.

The above hydrocarbons are considered to react with steam in accordance with the following reaction formulas.

$$C_nH_m + nH_2O \rightarrow nCO + (n+m/2)H_2 \quad (I)$$

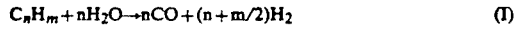

$$C_nH_m + 2nH_2O \rightarrow nCO_2 + (2n+m/2)H_2 \quad (II)$$

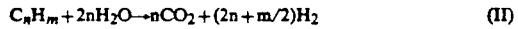

[n in the formulas (I) and (II) represents a real number of 1 or more and m represents a real number of 2 or more.]

In addition to the above formulas, reaction (III) of formation of $CH_4$ by hydrogenolysis of hydrocarbon and the following equilibrium reactions can be considered to occur jointly.

$$CH_4 + H_2O \rightleftharpoons CO + 3H_2 \quad (IV)$$

$$CO + H_2O \rightleftharpoons CO_2 + H_2 \quad (V)$$

Therefore, theoretically amounts of hydrocarbon and steam used can be determined in stoichiometric amounts which satisfy the above reaction formulas (I)-(V), but when the catalyst of the present invention is used, amounts of hydrocarbon and steam are preferably determined so that the steam/carbon ratio is 3-12, preferably 3-8.

By employing such steam/carbon ratio, gases rich in hydrogen can be efficiently and stably obtained. Reaction temperature is normally 300°-950° C., preferably 400°-850° C.

It is worth notice that the catalyst of the present invention has sufficiently high catalytic activity even at a reaction temperature of 500° C. or lower.

Reaction pressure is normally 0-50 kg/cm²G, preferably 0-20 kg/cm²G.

Reaction method may be any of continuous flowing method, batch method, and the like, but the continuous flowing method is suitable.

When the continuous flowing method is employed, gas space velocity (GHSV) of mixed gas of hydrocarbon and steam is usually 1,000-40,000 h$^{-1}$, preferably 2,000-20,000 h$^{-1}$.

What is worth notice when the catalyst of the present invention is used is that continuous operation is possible even at such high gas space velocity.

Reaction type is not limitative and may be any of fixed bed type, moving bed type, fluidized bed type, etc.

Type of reaction apparatus is also not limitative and, for example, a tube type reactor may be employed.

In this way, when hydrocarbon and steam are allowed to react in the presence of the catalyst of the present invention, the reaction proceeds normally and mainly in accordance with the above reaction formula (I), but since the reaction of the reaction formula (II), the equilibrium reaction (V) where produced carbon monoxide and water react to produce carbon dioxide and hydrogen and the equilibrium reaction (IV) where carbon monoxide and hydrogen react to produce methane and water also take place simultaneously, as a result there is obtained a mixture of hydrogen, methane, carbon monoxide and carbon dioxide, although main product is hydrogen.

The resulting mixed gas can be used as it is or can be separated into respective gas components, which are used for respective purposes.

The present invention is explained by the following examples.

EXAMPLE 1

A catalyst for steam reforming (Ru/ZrO$_2$) was prepared by supporting 0.5% by weight of RuCl$_3$ in terms of Ru on a ZrO$_2$ carrier obtained by firing ZrO$_2$.xH$_2$O and subjecting this catalyst to reducing treatment with hydrogen in a reaction tube.

Steam reforming was carried out using a normal-pressure fixed-bed flow type reaction apparatus, n-butane as a starting material and the following conditions; reaction temperature: 450° C., reaction time factor: 622.7 (g-cat.min/n-butane mol) and a steam/carbon ratio (feeding ratio of steam and n-butane calculated from molar ratio): 12.

Continuous analyses by a gas chromatography gave total conversion rate of 60.6% as a catalyst activity after 10 hours from initiation of the reaction and the following composition of the resulting gas: carbon monoxide: 1.1 mol %, methane: 20.7 mol %, carbon dioxide: 18.5 mol % and hydrogen: 59.7 mol %.

EXAMPLES 2-13

Procedure of Example 1 was repeated except that catalysts having the metals as shown in Table 1 supported were used. The results are shown in Table 1 together with those in Example 1.

COMPARATIVE EXAMPLE 1

Procedure of Example 1 was repeated except that a catalyst comprising zirconia carrier and rhodium supported thereon was used. The results are also shown in Table 1.

TABLE 1

| | Catalyst system | Total conversion rate (%) | Dry gas composition (mol %) | | | |
|---|---|---|---|---|---|---|
| | | | CO | CH$_4$ | CO$_2$ | H$_2$ |
| Example 1 | Ru/ZrO$_2$ | 60.6 | 1.1 | 20.7 | 18.5 | 59.7 |
| Example 2 | Rh-Ni/ZrO$_2$ * | 70.9 | 1.8 | 21.8 | 19.1 | 57.4 |
| Example 3 | Rh-Cr/ZrO$_2$ * | 61.3 | 1.9 | 17.2 | 20.0 | 60.8 |
| Example 4 | Rh-La/ZrO$_2$ * | 61.0 | 2.0 | 17.5 | 19.2 | 61.3 |
| Example 5 | Rh-Pr/ZrO$_2$ * | 57.6 | 2.2 | 15.1 | 20.2 | 62.5 |
| Example 6 | Rh-Nd/ZrO$_2$ * | 68.3 | 2.5 | 16.1 | 19.7 | 61.8 |
| Example 7 | Rh-Sm/ZrO$_2$ * | 84.9 | 2.8 | 19.6 | 19.7 | 58.0 |
| Example 8 | Ru-Th/ZrO$_2$ * | 68.2 | 2.1 | 13.9 | 20.1 | 63.8 |
| Example 9 | Rh-U/ZrO$_2$ * | 75.1 | 1.9 | 20.5 | 20.0 | 57.8 |
| Example 10 | Rh-Mg/ZrO$_2$ * | 69.9 | 1.9 | 17.5 | 20.4 | 60.1 |
| Example 11 | Rh-Ca/ZrO$_2$ * | 59.1 | 1.9 | 13.7 | 20.0 | 64.4 |
| Example 12 | Rh-Y/ZrO$_2$ * | 71.2 | 2.0 | 17.4 | 20.4 | 60.1 |
| Example 13 | Rh-Th/ZrO$_2$ * | 73.0 | 1.9 | 22.1 | 18.8 | 57.2 |
| Comp. Ex. 1 | Rh/ZrO$_2$ | 50.6 | 2.1 | 12.4 | 19.2 | 66.4 |

*: Supporting amount of Rh or Ru was 0.5% by weight and that of other elements was 1% by weight.

EXAMPLES 14-15

Life of catalyst systems shown in Table 2 was evaluated using normal-pressure fixed bed flow type reaction apparatus and n-butane as a starting material.

Reaction conditions were the following; reaction temperature: 450° C., reaction time factor: 622.7 (g-Cat.min./n-butane mol) and a steam/carbon ratio: 12.

The results are shown in Table 2.

COMPARATIVE EXAMPLE 2

Procedure of Examples 14-15 was repeated except that Rh/ZrO was used as a catalyst.

TABLE 2

| | Catalyst system | Total conversion rate (%) | |
|---|---|---|---|
| | | Initial | After 1,000 hr |
| Example 14 | Rh-Th/ZrO$_2$ | 68.2 | 68.1 |
| Example 15 | Rh-La/ZrO$_2$ | 61.0 | 60.5 |
| Comparative Example 2 | Rh/ZrO$_2$ | 50.7 | 47.0 |

EXAMPLES 16-20

Preparation of partially stabilized zirconia carrier

Zirconium alkoxide as zirconium source for zirconia component (formally ZrO$_2$) and an alkoxide of yttrium, magnesium or cerium as yttrium source, magnesium source or cerium source for yttrium oxide component (formally Y$_2$O$_3$), magnesium oxide component (formally MgO) or cerium oxide component (formally CeO$_2$) were respectively dissolved in isopropyl alcohol and water was added thereto with well stirring to effect hydrolysis to precipitate a composite oxide (hydrate) of large surface area comprising ultrafine particles of 0.03 μm in primary particle size. The resulting precipitate was washed, then dried at 120° C. for 24 hours and thereafter, fired for 3 hours in air to obtain a partially stabilized zirconia carrier having a composition desired as a carrier for partially stabilized zirconia supporting catalysts as shown in Table 3.

Preparation of catalyst

On the partially stabilized zirconia carrier was supported RuCl$_3$ or RhCl$_3$ in an amount of 0.5% by weight in terms of metal, followed by reducing treating with hydrogen in a reaction tube to prepare steam reforming catalyst supported on the partially stabilized zirconia as shown in Table 3.

Using the catalyst obtained above, steam reforming was carried out by normal-pressure fixed bed flow type reaction apparatus using n-butene as a starting material and employing the reaction conditions of reaction temperature: 450° C., reaction time factor: 622.7 (g-cat min./n-butane mol) and steam/carbon ratio of 12 (feeding ratio of steam and n-butane calculated from molar ratio).

Continuous analyses by a gas chromatography gave the results as shown in Table 3 on catalyst activity (total conversion rate) after 10 hours from initiation of the reaction and composition of the resulting gas (carbon monoxide, methane, carbon dioxide and hydrogen).

COMPARATIVE EXAMPLE 3

The catalyst Rh/ZrO$_2$ shown in Table 3 was obtained by supporting RhCl in an amount of 0.5% by weight of rhodium supported on ZrO carrier prepared by firing ZrO$_2$.xH$_2$O at 500° C. for 1 hour in air.

Reaction was carried out in the same manner as in Example 16 using the Rh/ZrO$_2$ catalyst.

The results are shown in Table 3.

EXAMPLE 21 AND COMPARATIVE EXAMPLE 4

As shown in Table 4, the same catalysts as used in Example 16 and Comparative Example 3 were subjected to long period life test under the same conditions as in Example 16.

Total conversion rates, pressure loss (relative value) of catalyst layer and change in surface area of catalyst according to BET method at the initial stage of reaction and after 1,000 hours onstream are shown in Table 4.

From the results as shown in Tables 3 and 4, it can be seen that the catalyst comprising the partially stabilized zirconia carrier of the present invention is an excellent catalyst for stream reforming of hydrocarbons, showing excellent catalyst activity, heat resistance, mechanical strength, less in reduction of surface area even at high temperatures, very hard to be powdered or broken due to shrink and improved in stability, reforming ability and life as compared with the catalysts comprising a zirconia carrier.

TABLE 3

| Catalyst system | | Total conversion rate (%) | Dry gas composition | | | |
|---|---|---|---|---|---|---|
| | | | CO | CH$_4$ | CO$_2$ | H$_2$ |
| Example 16 | Rh/partially stabilized ZrO$_2$ (1) | 67.8 | 2.7 | 19.4 | 19.7 | 58.3 |
| Example 17 | Rh/partially stabilized ZrO$_2$ (1) | 68.5 | 1.4 | 20.2 | 18.0 | 60.4 |
| Example 18 | Rh/partially stabilized | 71.0 | 2.6 | 19.3 | 19.6 | 60.4 |

TABLE 3-continued

| Catalyst | Catalyst system | Total conversion rate (%) | Dry gas composition | | | |
|---|---|---|---|---|---|---|
| | | | CO | CH₄ | CO₂ | H₂ |
| Example 19 | ZrO₂ (2) Rh/partially stabilized ZrO₂ (3) | 69.0 | 2.6 | 14.7 | 19.5 | 63.2 |
| Example 20 | Rh/partially stabilized ZrO₂ (4) | 65.0 | 2.4 | 16.5 | 19.3 | 61.8 |
| Comparative Example 3 | Rh/ZrO₂ | 50.1 | 2.1 | 12.3 | 19.2 | 66.4 |

Amount of support Rh 0.5 wt %
Partially stabilized ZrO₂ (1) Y₂O₃ 4.4%
Partially stabilized ZrO₂ (2) Y₂O₃ 8.0%
Partially stabilized ZrO₂ (3) CeO₂ 12.0%
Partially stabilized ZrO₂ (4) MgO 3.4%

TABLE 4

| | Catalyst system | Total conversion rate (%) | | Pressure loss of catalyst layer (relative value) | | Surface area of catalyst (m²/g) | |
|---|---|---|---|---|---|---|---|
| | | Initial | After 1000 hr | Initial | After 1000 hr | Initial | After 1000 hr |
| Comparative Example 4 | Rh/ZrO₂ | 50.7 | 47.0 | 1.0 | 2.2 | 60 | 20 |
| Example 21 | Rh/partially stabilized ZrO₂ (1) | 67.0 | 65.8 | 1.0 | 1.3 | 70 | 45 |

The present invention can provide a catalyst for steam reforming which maintains high catalyst activity even at a temperature of lower than 500° C., shows no reduction in catalyst activity even after long-term reaction, can efficiently reform hydrocarbons with steam even at low steam/carbon ratio and even when raw material gas is flowed at a high gas space velocity and can produce a mixed gas rich in hydrogen.

Furthermore, since the specific carrier of partially stabilized zirconia is used, the present invention can provide a catalyst for steam reforming of hydrocarbons having excellent merits such as high catalyst activity, superior heat resistance and mechanical strength and improved stability, reforming ability and catalyst life.

The catalyst of the present invention has good efficiency and is a catalyst suitable, for example, for small sized plant for preparation of hydrogen and for production of hydrogen for fuel cells.

What is claimed:

1. A process for steam reforming of hydrocarbons comprising reacting hydrocarbons with steam in the presence of a catalyst consisting essentially of:
   a zirconia carrier; and
   (A) at least one element selected from the group consisting of rhodium and ruthenium as an element mainly imparting reforming activity, and (B) at least one element selected from the group consisting of nickel, lanthanum, praseodymium, neodymium, samarium, thorium, uranium, chromium, magnesium, calcium and yttrium as an element for imparting co-catalyst function, both (A) and (B) being supported on the zirconia carrier.

2. A process according to claim 1, wherein the amount of at least one element selected from the group consisting of rhodium and ruthenium is 0.1-5% by weight of the zirconia carrier.

* * * * *

UNITED STATES PATENT AND TRADEMARK OFFICE
CERTIFICATE OF CORRECTION

PATENT NO. : 5,130,114
DATED : July 14, 1992
INVENTOR(S) : IGARASHI

It is certified that error appears in the above-identified patent and that said Letters Patent is hereby corrected as shown below:

On the title page, in item [30]:
  Change date of Priority Document No. 63,194752 from "August 4, 1983" to --August 4, 1988--.

Signed and Sealed this

Twenty-eighth Day of September, 1993

Attest:

BRUCE LEHMAN

Attesting Officer

Commissioner of Patents and Trademarks